June 10, 1924.

L. JAMES 1,497,022

EDUCATIONAL GAME

Filed June 29, 1920.

| | aimerais | aimerais | aimerait | aimerions | aimeriez | aimeraient |
|---|---|---|---|---|---|---|
| Conditionnel | | | | | | |
| Futur | aimerai | aimeras | aimera | aimerons | aimerez | aimeront |
| Passé Indéfini | ai aimé | as aimé | a aimé | avons aimé | avez aimé | ont aimé |
| Passé Défini | aimai | aimas | aima | aimâmes | aimâtes | aimèrent |
| Imparfait | aimais | aimais | aimait | aimions | aimiez | aimaient |
| Présent | aime | aimes | aime | aimons | aimez | aiment |
| | J' | Tu | Il | Nous | Vous | Ils |

INVENTOR
LUCILE JAMES;
BY
ATTORNEY

Patented June 10, 1924.

1,497,022

UNITED STATES PATENT OFFICE.

LUCILE JAMES, OF LOS ANGELES, CALIFORNIA.

EDUCATIONAL GAME.

Application filed June 29, 1920. Serial No. 392,657.

*To all whom it may concern:*

Be it known that I, LUCILE JAMES, a subject of the King of England, residing at Los Angeles, in the county of Los Angeles and State of California, have invented new and useful Improvements in Educational Games, of which the following is a specification.

My invention is a game, particularly useful for educational purposes, such as the study of languages.

The main object of my invention is to provide a game including three different classes or series of elements adapted to be mixed indiscriminately and to be arranged in such relation to each other as to determine a certain fact, such as the conjugation of a verb.

Another object is to provide a game including a set of cards on which are marked the different persons of a language, a set of cards on which are marked the tenses of the verbs of the languages, and other sets of cards on which are respectively marked the different forms of the verbs of the language, which sets of cards may be laid out in such relation to each other as to determine the conjugation of the verbs.

Other objects will appear hereinafter.

My invention is illustrated in the annexed drawing forming a part of this specification, in which, the figure is a view in plan of the elements of my game laid out in such relation to each other whereby a certain fact is disclosed, namely, the conjugation of the verb "aimer."

In the drawing I show three sets of cards indicated 1, 2 and 3, respectively. On the set of cards 1 are the personal pronouns Je, Tu, Il, Nous, Vous, and Ils, respectively, of the French language. On the set of cards 2 are the tenses Présent, Imparfait, Passé Défini, Passé Indéfini, Futur, and Conditionnel, of the French language. On the set of cards 3 are respectively the various forms of the French verb "aimer." On other sets of cards 3 are the various forms of other French verbs. As seen, the cards in the three sets 1, 2 and 3 are arranged horizontally and vertically in their regular order so that the drawing thus will serve as a chart, by the memorization of which the student or player of the game can readily determine, in any tense or person, the form of the verb referred to in the chart.

In playing this game, always begin by spreading out the cards 3 on which are the various forms of the verb "aimer."

First: Sort out the names of the six tenses; placing them horizontally on the table—as follows:—Présent—Imparfait—Passé Défini—Passé Indéfini—Futur—Conditionnel.

Second: Find the names of the six different persons—Je—Tu—Il—Nous—Vous—Ils—placing them vertically downwardly in order at the left of the card marked Présent.

Third: The stem of all regular verbs is obtained by taking "er"—"ir"—or "re" from the infinitive.

Endings then added to the stem will form the six persons of the different tenses.

The endings of the present tense are— e—es—e—ons—ez—ent—and by adding these to the stem (in this case) "aim" we have — aime — aimes — aime — aimons— aimez—aiment. Now place them beside Je— Tu—Il—Nous—Vous—Ils and under the word Présent.

Fourth: Find six cards having two words on each and put them under Passé Indéfini.

(The student should know the verb "avoir" in its present tense to be able to correctly place the Passé Indéfini.)

There are three reasons for selecting the Passé Indéfini after the Présent, instead of the Imparfait:

1. The Passé Indéfini is the tense used for conversation.

2. To find cards with "two words" is very easy.

3. The first of the two words is going to help form the tenses on either side.

Fifth: The first of the two words of the Passé Indéfini—preceded by "er"—will give the endings of the future tense—dropping "av" from the 4th and 5th persons.

Sixth: The Passé Défini is formed by adding the first word of the Passé Indéfini to the stem, in the singular persons—Je—Tu—Il.

For the last three, find words having accents. Those with accent circonflexe are placed first—notice their only difference—M and T, M coming before T in the alphabet is used first.

Seventh: Divide the remaining twelve cards into two groups—six cards having "er", like the future tense had and six cards without "er". Those having "er" should go under the Conditionnel—and the last six under Imparfait.

Remember that the 2nd person, singular, has an "s" in every tense.

All regular verbs ending in "er" come under these rules.

When the verb "aimer" is completely mastered—take the cards 3, on which are the various forms of the verb "finir," and spread them out as the cards having the various forms of the verb "aimer" marked thereon were before spread out.

1st and 2nd plays of this verb are the same as 1st and 2nd for "aimer."

3rd play of this verb differs only in the endings, which are as follows:—is—is—it issons—issez—issent.

4th play is the same as for verb "aimer."

5th. In the verb "finir" you have "ir" in place of "er."

6th. In the Passé Défini the first three persons are like the first three of the present tense. The next two have accent circonflexe and the last person is "finirent."

7th. Remembering that Conditionnel endings are the same as the Imparfait—sort out these two tenses. The Imparfait has "iss" added to its stem "fin" before its endings.

All regular verbs ending in "ir" come under these rules.

Now take the cards 3 on which the various forms of the verb "rompre" are marked. This verb, if the two others have been well learned, should be done without any difficulty. Just keep in mind that the Futur and Conditionnel tenses always have "r" before their endings.

The Passé Défini endings of the verb "rompre" are exactly like the Passé Défini's of verb "finir."

Conditionnel and Imparfait endings are alike, the Conditionnel's stem being followed by "r."

All regular verbs ending in "re" come under these rules.

The verbs avoir and être (auxiliary verbs) are classified under irregular verbs. In the study of them, we must remember that the endings of the Futur and Conditionnel tenses of irregular verbs are the same as for regular verbs. Therefore, it will be very easy to find the Passé Indéfini, Futur and Conditionnel tenses of these two verbs.

The present tense of the auxiliary verbs can be formed in any grammar.

The Imparfait is conjugated in the regular way. The stem "av" (for "avoir") is taken to which the Imparfait endings are added.

The stem "êt" (for être) is taken to which endings are added.

It should be noticed that educational games—in which nouns or pronouns are arranged in a certain rotation on one sheet; certain verb forms on another sheet; suitable objects in rotation on a third sheet, and modifiers of the objects on a fourth sheet—or games, in which a plurality of the nouns, pronouns, verb forms, objects and their modifiers are arranged on one sheet or card, fail to furnish the mind of the student or player of such games with exercise sufficient to be of any value to the player as far as learning the language, which is supposed to be taught by means of such games, is concerned, because the many forms simultaneously exposed to view are confusing to the mind and therefore greatly impede the progress of the student in his efforts to remember the proper tense forms of the various verbs in their combination with other selected words.

It is the ultimate purpose of my invention to furnish the mind of the student or player of an educational game with exercise of such a nature as will be especially valuable to a student or player in helping him remember the different tense forms used in conjunction with selected singular or plural nouns or pronouns, or the person with which a selected tense form of a verb may be combined in a properly constructed sentence. This object is accomplished by means of the set or series of cards, each of which card has only one word marked thereon and is entirely separate from the other cards, so that the cards can be mixed indiscriminately, thereby dissuading the student from the temptation of looking at more than one word at a time and thus providing a mental stimulus whereby he is urged and aided in his power of concentration and the consequent memorization of the chart, produced by laying out the cards as shown in the drawing, is facilitated, so that he is enabled quickly and without hesitation to apply correctly the required form of the verb as given by the chart.

It is obvious that by this exercise of the mind the student will learn much quicker than by other methods that place hindrances in the form of confusing combinations before the student, and the game is therefore especially adapted for the purpose of teaching young children or others more or less lacking concentrative powers, and that by furnishing the required mental exercise my invention is a valuable addition to the art. It is further clear that, although the invention is here shown only applied to the teaching of the French language, it can be applied to other languages or to other branches of education where it is possible to give instruction by means of sets or series of cards capable of being mixed indiscriminately and to be arranged in such a relation to each other as to determine a certain fact.

I claim:

1. A game including three classes of elements adapted to be mixed indiscriminately, said elements containing such indicia that they may be arranged in such relation as to determine the conjugation of a verb.

2. A game including a set of cards on which are marked the different personal pronouns of a language, a set of cards on which are marked the different tenses of the language, and a set of cards on which are marked the various forms of a verb of the language, all of said cards being adapted to be mixed indiscriminately.

3. A game including a set of cards on which are marked six different persons of a language, a set of cards on which are marked six different tenses of the language, and a set of cards on which are marked various forms of a verb corresponding to said persons and said tenses, all of said cards being adapted to be mixed indiscriminately.

4. A game including a set of cards marked respectively Je, Tu, Il, Nous, Vous, Ils; a set of cards marked respectively Présent, Imparfait, Passé Défini, Passé Indéfini, Futur and Conditionnel, and a set of cards on which are marked the various forms of a French verb corresponding to said persons and said tenses, all of said cards being adapted to be mixed indiscriminately.

5. An educational game comprising a group of the cards bearing the names of the tenses of a language adapted to be arranged promiscuously in a row, another group of the cards bearing the personal pronouns of the language adapted to be arranged promiscuously in a row at right angles to the row of cards bearing tenses, and a third group of the cards each bearing a complete verb form for the tenses and persons indicated on the other cards adapted to be placed in rows aligning with the rows of cards bearing tenses and pronouns.

6. An educational game, comprising a group of cards bearing the names of the tenses of a language, said cards adapted to be arranged promiscuously in a row, means bearing the personal pronouns of the language in a row adapted to be arranged at right angles to the row of cards bearing the tenses, and a group of separable cards each bearing a complete verb form for the tenses and pronouns adapted to be placed in rows aligning with the rows of tenses and pronouns.

7. An educational game comprising a group of cards bearing the personal pronouns of a language, said cards adapted to be arranged promiscuously in a row, means bearing the tenses of a language arranged in a row adapted to be disposed at right angles to the row of cards bearing the pronouns, and a group of separable cards bearing the complete verb form for the pronouns and tenses adapted to be placed in rows aligning with the rows of pronouns and tenses.

LUCILE JAMES.